Figure 5:
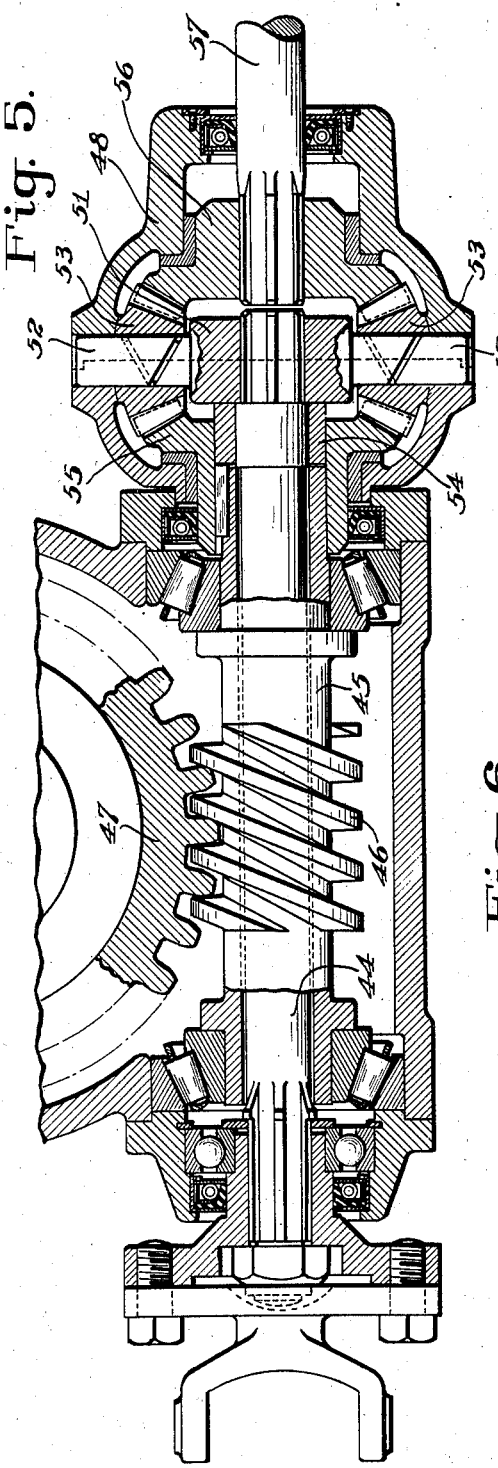

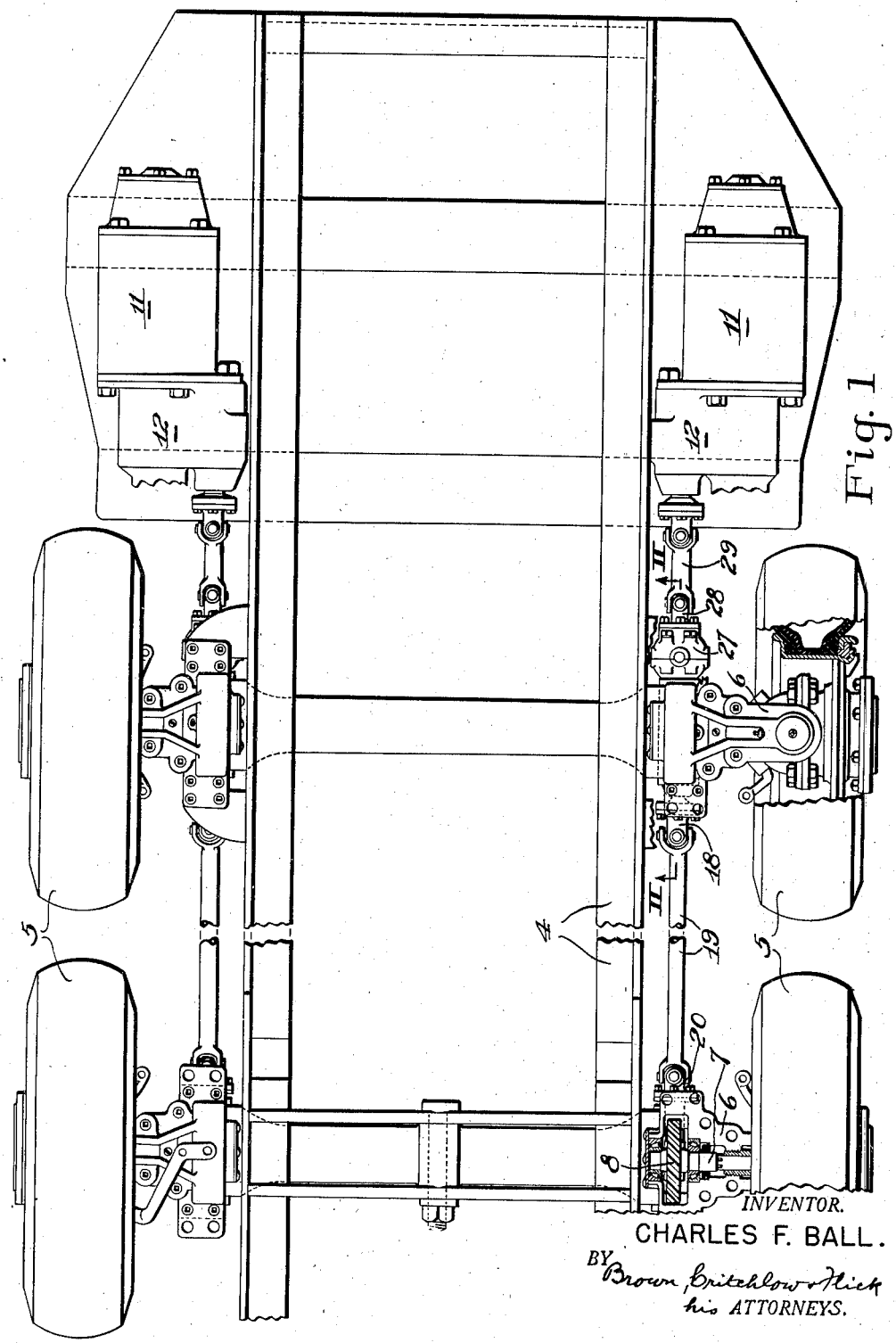

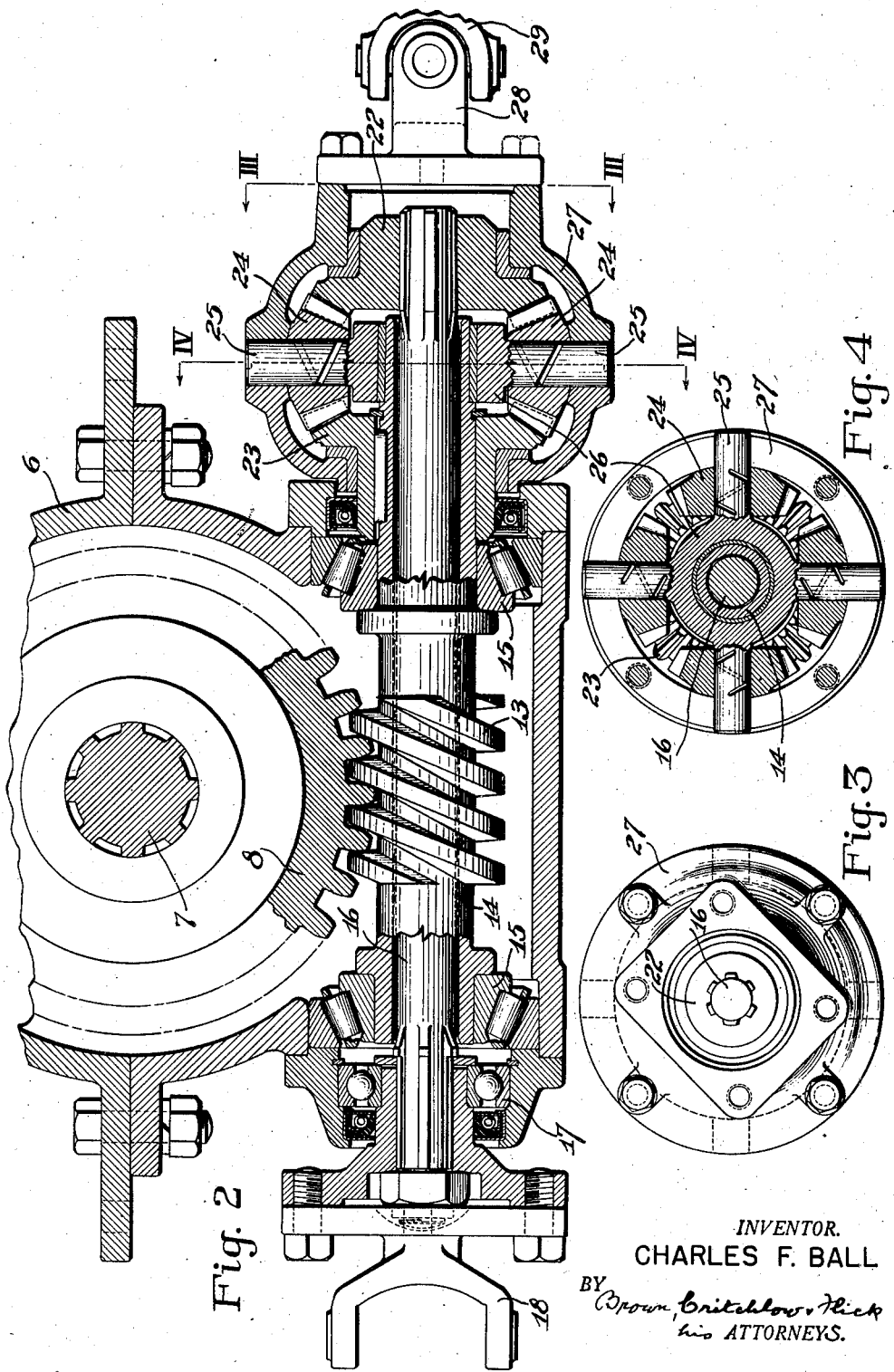

July 10, 1945.  C. F. BALL  2,380,012
DRIVE FOR VEHICLES
Filed March 19, 1942  3 Sheets-Sheet 3

INVENTOR.
CHARLES F. BALL.
By Brown, Critchlow & Flick
his ATTORNEYS.

Patented July 10, 1945

2,380,012

UNITED STATES PATENT OFFICE 2,380,012

DRIVE FOR VEHICLES

Charles F. Ball, Franklin, Pa., assignor to Joy Manufacturing Company, Franklin, Pa., a corporation of Pennsylvania.

Application March 19, 1942, Serial No. 435,303

3 Claims. (Cl. 74—311)

This invention relates to power drives, and more particularly to such drives that include a differential.

In the usual drive in which a differential is used the differential is located between the points to which the power is delivered, and the power is transmitted from its source to the differential by a drive shaft disposed at an angle to the driven shafts connected to the differential on opposite sides of the drive shaft. There are times, however, when such an arrangement is not feasible, such as when the power must be delivered to one or more driven shafts by a drive shaft located at one end of the driven shafts substantially in axial alignment therewith. For example, in mine haulage vehicles, such as shuttle cars that have a four wheel drive, the body or load-carrying portion of the vehicle extends as far down as possible between the wheels so that the overall height of the vehicle can be maintained low for entrance into low mine passages. The underslung body makes it impossible for the power plant to be placed under the body between the axles and for the rotating axles to extend across the car, so each wheel is mounted on its own stub axle at the side of the body. The front and rear wheels on each side are driven in tandem by an electric motor mounted at one end of the car at the side of the body in the space formed by the longitudinally inclined end of the body's floor. Heretofore such a tandem drive has had the serious disadvantage that it lacks a differential that will permit the front and rear wheels to rotate at different speeds. Consequently, the wheels constantly fight each other as first one and then the other tries to go too fast. That slight difference in speed causes a considerable extra load on the drive gears which results in power loss and extra wear of the gears and tires.

The principal object of this invention is to provide a power drive in which the driving means is disposed at one end of the shafts that it is driving, having a differential operatively connecting the ends of the driven shafts. A more specific object is to provide such a drive in which two shafts are concentric and relatively rotatable with a differential operatively connecting them at one end.

In accordance with this invention a pair of rotatable concentric shaft members are operatively connected together at one end by a differential member. One of these members, i. e., one of the shafts or the differential member, is adapted to be connected to a source of power at one end the shafts which rotates it and thereby rotates the other two members. In the preferred form the differential is driven by the power means and the power is taken off from the two concentric shafts which may be operatively connected to two wheels in tandem or to any other members that it is desired to drive. However, if desired, the power means can be connected to the inner concentric shaft for driving a differential which distributes the power to the outer shaft and to a shaft in line with the inner shaft. In a mine shuttle car or the like in which two wheels are driven in tandem the power means may be mounted at one end of the car near one of the wheels and the differential may be located either between the power means and the adjacent wheel or between the two wheels. In either case the principle of concentric shafts connected by a rotating differential is utilized. This drive also can be used in a truck having two driven rear axles behind the power plant. In such a case the driven shafts of the drive transmit power to standard differentials in the two axles.

Figure 6:
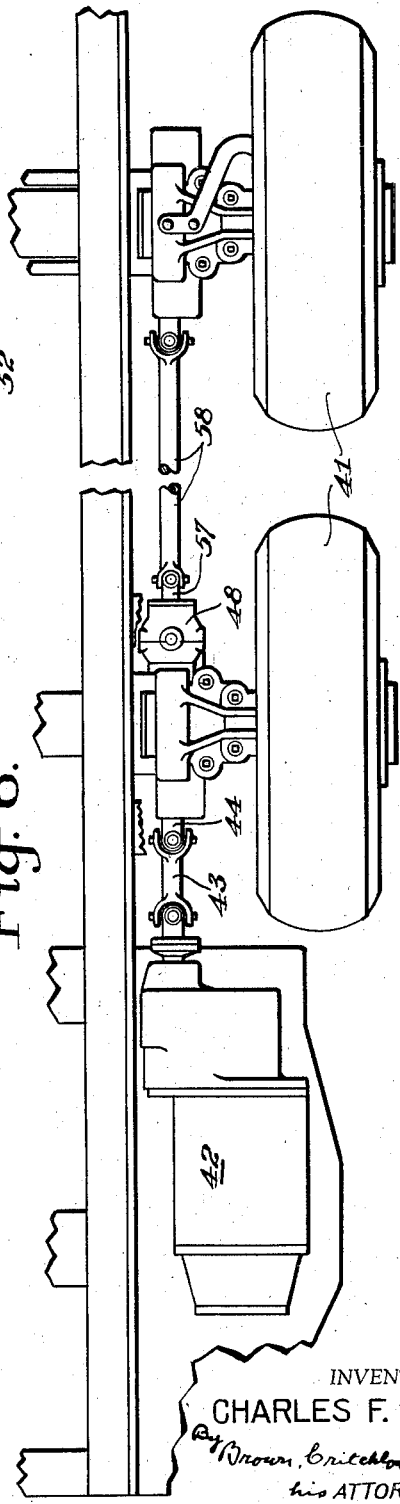

The invention is illustrated in the accompanying drawings in which Fig. 1 is a fragmentary plan view, partly broken away, of a mine shuttle car chassis showing my power drive connected to the four wheels of the vehicle; Fig. 2 is an enlarged fragmentary vertical section through the differential and concentric shafts taken on the line II—II of Fig. 1; Fig. 3 is an end view of the differential taken on the line III—III of Fig. 2; Fig. 4 is a vertical section of the differential taken on the line IV—IV of Fig. 2; Fig. 5 is a view similar to Fig. 2 of a modified embodiment of the invention; and Fig. 6 is a fragmentary view, similar to Fig. 1, showing the drive of Fig. 5 mounted in a mine shuttle car or the like having tandem driven wheels.

Referring to Fig. 1 of the drawings, the frame or chassis 4 of a vehicle, such as a mine shuttle car, is provided with four steered wheels 5 connected by steering mechanism (not shown) to a steering wheel or lever. Each wheel is located at the outer end of an axle housing 6 that is rigidly connected at its inner end to the car frame for supporting the latter. The connection between the wheel and the outer end of this housing is conventional and forms no part of this invention, so it need not be described in detail. It is sufficient to point out that the wheel-carrying spindle can turn on a vertical axis through the outer end of the axle housing and that it is operatively connected by a swivel joint to the outer end of a short shaft or stub axle 7 journaled in the housing. This shaft has a worm gear 8 non-rotatably mounted on its inner end and through which the axle and associated wheel are rotated.

As shuttle cars of this type are built so low that there is no room for the power plant under the central portion of the body, a separate power plant is mounted at each side of the vehicle. Likewise, as there is not enough room at the sides of the body between the wheels to accommodate the power plants they are placed at one end of the car. Each power plant includes an electric motor 11 the current for which may be supplied by batteries carried by the car or through a cable connected to a stationary power plant at a distance. The motor drives the adjacent wheels in tandem through a speed reducing unit 12 connected to its inner end.

It is a feature of this invention that each motor delivers power to both of the wheels on the same side of the car through a differential. Referring now to Fig. 2 the worm gear 8 mounted on the stub axle nearest the motor is driven by a worm 13 rigidly mounted on a tubular shaft 14 journaled in bearings 15 that are carried by a downwardly extending portion of axle housing 6. Extending entirely through this tubular shaft in spaced concentric relation therewith is an inner shaft 16 that is rotatably mounted at the end farthest from the motor in a bearing 17 supported by the axle housing. That end of the inner shaft is provided with a coupling 18 for driving a propeller shaft 19 (Fig. 1) extending along the side of the car frame to a short shaft 20 journaled in the other axle housing similarly to shaft 14. Shaft 20 likewise is provided with a worm for driving the adjoining worm gear 8.

In order to rotate the shafts mentioned thus far, the ends of the concentric shafts 14 and 16 adjacent the motor are operatively connected to the motor by means of a differential. Thus, the end of inner shaft 16 projecting toward the motor is splined in a bevel gear 22 that faces a similar gear 23 keyed on the hollow shaft 14 a short distance from its end. Meshing with both of the gears is a plurality, preferably four, of bevel pinions 24 each of which is journaled on a radial pin 25 forming part of a spider 26 that is rotatably mounted on the outer shaft between the two gears. The outer ends of these pins project beyond the pinions and into openings in a differential housing 27 that is made in two parts bolted together in the central plane of the spider. The housing and spider are thus rigidly connected together with the former surrounding the gears and pinions and rotatably mounted on the gear hubs. The outer end of the differential housing is provided with a coupling 28 by which it is connected to a short drive shaft 29 that is coupled to the speed reducer 12, as shown in Fig. 1. Drive shaft 29 is substantially in axial alignment with the shafts that it drives.

In operation the motor-driven drive shaft 29 rotates the differential housing which in turn rotates the spider connected thereto. The pinions 24 that bridge gears 22 and 23 rotate those gears and thereby drive the two concentric shafts. As long as both wheels on that side of the car are rotating at the same speed the pinions 24 carried by the rotating spider do not turn on pins 25 because gears 22 and 23 do not turn relative to each other. But whenever either wheel tends to turn at a different speed than the other one the two concentric shafts are allowed to rotate relative to each other because the pinions in the differential housing will rotate on pins 25 and thereby permit the gears 22 and 23 to turn relative to each other as they rotate with the differential housing. It will therefore be seen that the differential housing, spider, gears and pinions continuously rotate as a unit around an axis coinciding with that of the concentric shafts, but at times the gears and pinions also turn relative to one another to produce the usual differential action between the wheels. As a result the wheels can rotate at different speeds relative to each other without placing extra load on the driving gears and without power loss and extra wear on the driving mechanism and tires.

In the embodiment of the invention shown in Figs. 5 and 6 the differential is placed between the front and rear wheels 41, but the motor 42 remains at one end of the vehicle with its drive shaft 43 substantially in line with the shafts that it drives. With this arrangement the inner concentric shaft 44 is connected directly to drive shaft 43 and, in effect, forms an extension thereof. The outer concentric shaft 45 is connected by a worm 46 to the worm gear 47 mounted on the stub axis of the wheel closest to the motor. In this case the differential housing 48 is rotated by inner shaft 44 instead of directly by the motor drive shaft. Consequently, the spider 51 is rigidly mounted on the projecting end of the inner shaft so that its rotation is transmitted to the housing through its radial pins 52 that carry rotatable pinions 53. A bearing 54, encircling the inner shaft beside the spider, centers that end of the shaft relative to the outer shaft and the gear 55 keyed on the latter. The other wheel on the same side of the car is driven by the other differential gear 56 through a shaft 57 splined therein and coupled to a propeller shaft 58 (Fig. 6) that extends along the side of the car frame as in the first embodiment.

In the operation of this modification inner shaft 44 rotates the spider and differential housing so that pinions 53 rotate the two gears in unison to thereby drive outer shaft 45 and shaft 57 connected to gear 56. If one of the gears starts to turn more slowly than the other, the pinions will turn on the spider pins and the wheels will be driven at different speeds without imposing extra load and wear on the driving mechanism.

It will be noted that in both embodiments of the invention disclosed herein the entire differential is rotated and one of the wheels is driven by a hollow shaft surrounding either the shaft that drives the other wheel or the primary drive shaft.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A differential drive comprising a pair of relatively rotatable concentric shafts with the inner shaft projecting from both ends of the outer one, a bearing supporting one end of the inner shaft, external bearings for both ends of the outer shaft, said outer shaft having an extension projecting from one of said external bearings, one end of the inner shaft projecting from said extension, a pair of bevel gears facing each other and having driving connection with the outer shaft extension and the adjacent projecting end of the inner shaft, a spider rotatably supported by said extension of the outer shaft between said gears, a plurality of bevel pinions rotatably mounted on the spider and meshing with said gears, a rotatable housing surrounding said gears with one end of the housing supported by said outer shaft extension, the central portion of said housing being rigidly mounted on the spider by which the housing also is supported, the opposite end of said housing rotatably supporting said adjacent projecting end of the inner shaft, a shaft connected to said housing, the outer shaft and one of the other two shafts being adapted to be connected to driven means, and means for operatively connecting the remaining shaft to driving means.

2. A differential drive comprising a pair of rotatable concentric shafts, bearing supports for both ends of the outer shaft, a bearing support for one end of the inner shaft, the opposite end of the inner shaft projecting from the outer shaft, the outer shaft having a sleeve-like extension extending part way along said projecting end of the inner shaft, a bevel gear having a hub keyed to said extension of said outer shaft, a bevel gear rigidly mounted on the end of the inner shaft projecting from said extension, a spider journaled on said extension of the outer shaft between said gears and having more than two radially extending pins, bevel pinions rotatably mounted on said pins and meshing with said bevel gears, and a housing surrounding said gears and pinions and carried by the outer ends of said spider pins, one end of said housing being journaled on said gear hub, and the opposite end of the housing forming the only bearing support for said projecting end of the inner shaft, said opposite end of the housing being formed for connection to driving means.

3. A differential drive comprising a pair of rotatable concentric shafts, bearing supports for both ends of the outer shaft, a bearing support for one end of the inner shaft, the opposite end of the inner shaft projecting from the outer shaft, the outer shaft having a sleeve-like extension extending part way along said projecting end of the inner shaft, a bevel gear having a hub keyed to said extension of said outer shaft, a bevel gear having a hub rigidly mounted on the end of the inner shaft projecting from said extension, a spider journaled on said outer shaft extension between said gears, bevel pinions rotatably carried by said spider and meshing with said bevel gears, and a housing surrounding said gears and pinions and rigidly mounted on said spider at more than two circumferentially spaced points, one end of said housing being journaled on the gear hub mounted on said shaft extension, whereby the housing is firmly supported at two axially spaced points, and the hub of the gear mounted on said inner shaft being journaled in the opposite end of said housing and thereby supporting the adjoining end of the inner shaft.

CHARLES F. BALL.